United States Patent
Hon

[19]

[11] Patent Number: 6,074,213
[45] Date of Patent: Jun. 13, 2000

[54] FRACTIONAL PROCESS SIMULATOR WITH REMOTE APPARATUS FOR MULTI-LOCATIONAL TRAINING OF MEDICAL TEAMS

[76] Inventor: David C. Hon, 1450 NW. Woodbine Way, Seattle, Wash. 98177

[21] Appl. No.: 09/134,945

[22] Filed: Aug. 17, 1998

[51] Int. Cl.[7] .................................................. G09B 23/28
[52] U.S. Cl. .......................... 434/262; 434/267; 434/272
[58] Field of Search .................................. 434/262, 267, 434/272

[56] References Cited

U.S. PATENT DOCUMENTS

| | | | |
|---|---|---|---|
| 4,907,973 | 3/1990 | Hon | 434/262 |
| 5,261,404 | 11/1993 | Mick et al. | 128/653.1 |
| 5,769,640 | 6/1998 | Jacobus et al. | 434/262 |
| 5,769,641 | 6/1998 | Lampotang et al. | 434/272 |
| 5,791,907 | 8/1998 | Ramshaw et al. | 434/262 |
| 5,800,178 | 9/1998 | Gillio | 434/262 |
| 5,800,179 | 9/1998 | Bailey | 434/262 |
| 5,853,292 | 12/1998 | Eggert et al. | 434/262 |
| 5,855,553 | 1/1999 | Tajima et al. | 600/407 |
| 5,882,206 | 3/1999 | Gillio | 434/262 |
| 5,909,380 | 6/1999 | Dubois et al. | 351/205 |

*Primary Examiner*—Valencia Martin-Wallace
*Assistant Examiner*—Chanda Lynette Harris
*Attorney, Agent, or Firm*—Crutsinger & Booth; James O. Dixon

[57] ABSTRACT

This invention relates to a simulator for training medical teams, the members of which are located in different places, or stations, as they train together using apparatus in coordinated fashion in relation to a numerical data, or virtual, non-physical model without input from a live instructor, wherein each remote station provides a differentiated input with a plurality of differentiated devices, and receives differentiated feedback from the model to each individual station in representations which are visual, tactile, aural, and/or olfactory in their display, depending on the feedback required by each individual station.

20 Claims, 10 Drawing Sheets

FRACTIONAL PROCESS SIMULATOR WITH REMOTE APPARATUS FOR MULTI-LOCATIONAL TRAINING OF MEDICAL TEAMS

BACKGROUND OF THE INVENTION

In medicine, it is necessary for teams of people to play roles which in which information input and output, and often the exercise of psychomotor skills, must be coordinated in a highly organized manner. In addition to requiring types of information and making correct decisions, issues of precedence of action and both individual and group timing of actions become the keys to effective team performance. Obviously, the emergency room is a prime example of this highly skilled, highly timed teamwork, for the patient may die in several seconds of hesitance or extraneous action.

A general description of one of the medical activities simulated by the current invention offers a groundwork for the need for a new type of team simulator. Operating room teams anticipate cardiac arrest, and are prepared as part of their mission. However, Advanced Cardiac Life Support is an emergency activity—sometimes called a "code"—which takes place in every hospital in the emergency room, the critical and intensive care units, and in any other usable hospital area which is near to where a cardiac arrest occurs. The "code" is a result of a patient's heart stopping—called cardiac arrest—and when the heart stops, it will be approximately three or four minutes until the cells of the patient's brain begin to die from a lack of oxygenated blood to the brain. Thus the "code" activity must begin immediately upon anyone's knowledge of cardiac arrest. At times, especially outside the hospital, cardiopulmonary resuscitation (CPR) is used for temporary oxygenation and blood flow. But life stabilization requires a medical team working with greater tools and precision than in CPR. This Advanced Cardiac Life Support team should be formed within minutes, preferably within seconds, from any knowledgeable medical personnel in the area. There are usually no pre-set team leaders or members, except in the emergency rooms and intensive care units.

Although there will frequently be more personnel involved in an actual code, the minimum number of personnel required to administer Advanced Cardiac Life Support is usually four, (1) a team leader who is also responsible for administering defibrillation, (2) an oxygen administrator who is responsible for proper incubation and administration of adequate oxygen supply, (3) a person responsible for chest compression, and (4) one or more medical personnel responsible for intravenous (IV) administration of drugs and fluids and for taking blood samples for rapid assessment of blood gas levels in the patient. Obviously, with more than four people, some activities may be divided and others may allow switching over to back-up personnel as the "code" continues. "Stabilization" is achieved when the cardiac arrest patient is breathing without assistance, a regular and acceptable heart rhythm provides consistent blood flow to the brain and all parts of the body, and the body has an adequate supply of fluids and chemicals—even if supplied by intravenous tubes—to provide a normal chemical balance in the patient's heart and lung activity.

The Advanced Cardiac Life Support team is essentially providing several services to the patient in tandem: keeping the patient alive by expert and timely CPR intervention, accessing the patient's condition moment by moment, and providing various inputs—oxygen, chest compressions, electronic defibrillations, drugs, and fluids—all on a more precise and thorough basis than Cardio-Pulmonary Resuscitation (or CPR, which is also called Basic Life Support). Thus this simulator allows individuals to develop team skills without gathering a whole team in one location, and enables any practiced individual to instantly integrate with a team with little or no integration time. The simulator also enlarges the number of capable team members available when there is a cardiac arrest incident or "code." The number of such code-capable personnel available at the spontaneous incident then directly and measurably increases the chances of any patient surviving cardiac arrest with no brain-cell damage due to lack of oxygenated blood. The goal, of course, is stabilized breathing and heart rate.

Beyond this precise need for an emergency medical team, it is apparent that whenever teams must be able to coordinate in an urgent situation, it is necessary that they have practiced the procedure to fill each of their roles. Despite the high impact of quality team performance that is necessary to preserve life, in many cases the sheer logistics of pulling together people and equipment from remote locations now makes the time and cost for these team practices prohibitive. This also applies to surgeries, and to other types of training for team coordination.

Proposals of prior art have been made, specifically the patent of U.S. Pat. No. 4,360,345 granted Nov. 23, 1982 to David Hon. According to the proposals of that patent, there is provided a computer-controlled interactive instruction system for teaching an individual how to administer cardiopulmonary resuscitation. However laudatory those proposals may be, they were structure toward comparing a technique being adminstered to a dummy with standard indicia stored in the computer, and did not propose surrogate invasive travel within the subject. These proposals of this prior art were concerned with specific performances and external responses but did not contemplate a full range of indicia that would be necessary for life like simulation of a range of medical conditions including surgery. Accordingly, there continued to be a need for simulation that was life-like and that provided a full range of indicia that may be encountered when performing complex emergency surgical procedures on a living person. In addition, there continued to be a need for team simulation in which each team unit played a separate and differentiated role.

Another proposal of prior art is U.S. Pat. No. 4,907,973, granted Mar. 13, 1990 to David C. Hon. This proposal, entiltled: "Expert system simulator for modeling realistic internal environments and performance" represents an investigative medical system which must include a physical model representing physically and spatially the part of the body being operated upon, and one or more implements for input which give input to the simulation only, but with no output back to the user through the implement. However laudatory these prior proposals may be, the simulated experience called for in these instances of prior art are by their nature central and singular and focused in one location, and due to operation from first memory means only, the simulation changes in a like manner for all who may be inputting with various implements. The surgeries contemplated are only internal anatomical landscapes within a physical and spatial representation. Accordingly, there continued to be a need a team experience for team members in various remote locations with no physical or spatial representation of internal or external anatomy at any station, bringing in differentiated inputs from each of a plurality of remote stations, and giving out differentiated feedback to each of those stations by representations on visual, tactile, aural, and/or olfactory displays.

BRIEF SUMMARY OF THE INVENTION

The invention relates to a simulator for training teams, the members of which are located in different places, or stations, as they train together with apparatus in relation to a numerical data, or virtual, model with no physical or spatial representation of any patient or portion of a patient's anatomy. More particularly, this virtual model is fractional, wherein as each remote station provides a differentiated input with a plurality of differentiated devices, and receives differentiated feedback from the model to each individual station in representations which are visual, tactile, aural, and/or olfactory in their display, depending on the feedback required by each individual station. The operation or evaluation of this team simulation does not require a live instructor.

The current invention applies to Advanced Cardiac Life Support, a medical practice which must have high coordination of information input, decision-making, prompt execution of decisions, and application of psychomotor skills timed with the rest of the team activity to save lives. The current invention simulates the activity in real time, and accesses the performance of each team member. There will be no instructor presiding, or providing additional inputs to the process after it starts as a simulation between team members. The parameters of the team simulations will be set before it begins, in the virtual, fractional software model and in the second memory means at each individual team station.

The devices involved may vary as long as they allow input to the process as called forth herein. At one level, mere information retrieval and proper decisions and selection of action by team members in response to information may be sufficient to simulate the complex activity. However, it is the intention of this invention to include psychomotor inputs and force feedback and other outputs of the kind that strongly infer the team member's ability to provide proper psychomotor input to the timed and coordinated activity. Also, any team station may be substituted by the computer to play that role directly according to rule-based expert system contained within the model. This allows the computer to become a test bed to insert new situations and observe how the process works with new variables. Thus the simulator, while an excellent teaching tool, moves beyond that as a process R&D.

In order that the invention may be used at any time by any of the prospective members of a team, it must be pre-programmed so as not to require any human monitor of the activity, to be fractional among a plurality of locations, and to provide individual input and individual station feedback in a variety of representations as appropriate. Furthermore, the simulator as described herein allows the remote team member to fill any of the roles if the proper input devices are available at that station, allows the team to operate less than a full complement of humans available—with the computer playing a role at one or more empty stations, and provides that random situations may change character during the course of the code, either due to actions of the team or to unexplained circumstances within the patient.

A second embodiment of the invention is the surgical team, each of whom may have far more precise qualifications than members of the spontaneously assembled Advance Cardiac Life Support team. In the surgical team, a anesthesiologist monitors vital signs and adjusts anesthesia and other inputs, while the surgeons perform surgeries and the nursing staff assembles instruments and passes them to the surgeon on a timely basis. Because the necessity of timing and interrelationship is very important in surgical roles, it is highly important that the simulator give each individual personal and discreet, differentiated feedback in visuals, sound, and tactility, as well as giving him or her the ability to understand and anticipate the actions of others.

The surgical team in this embodiment of the invention has voice communication between remote stations to assist coordination of performance, but the fractionated model allows each station at each location to offer its discreet and differentiated inputs to the model in the appropriate manner, amount, and timing. The assistant surgeon must grasp and hold certain tissue out of the way, and various other tissue taut, and feel a proper resistance from the virtual model in both instances, while the lead surgeon is dissecting, stapling, and various other tasks on the tissue being held taut. The anesthesiologist or the nurse has no such feedback, but responds to other signs given back to their station in differentiated manner by the computer dealing in the fractionated model.

Other applications, both medical and non-medical, are encompassed in this invention as long as: (1) the invention is a numerical data model, with no physical or spatial representation of anatomy, (2) can be used in a plurality of locations by members of a team simulation, (3) is pre-programmed so as not to require any human instructor presiding, or providing addition inputs to the activity, (4) allows empty station roles to be played by computer (5) is able to be used in a high speed network over any distance, given proper bandwidth and transmission, (6) has an "expert system" in the computer to monitor performance and restate situational representation, and (7) employs differentiated input devices that would be appropriate to the team activity, which are actuated like instruments for actual input, and (8) sends back to each separate station a selected set of representations of those differentiated visual, audio, tactile feedback and/or olfactory effects that would ordinarily be afforded to live team members in the surgery.

The invention is applicable to any activity of two or more persons operating upon a fractional, event-driven model, in a simulation which requires precise performance reaction to events portrayed and precise timing of correct information requests and timely input of both informational and psychomotor activity. The invention is a networked system of inputs and outputs, managed by a computer with real-time capabilities which also provides computer-generated role playing of the "missing" capable team members, and designed to closely approximate the impressions and timing of a team activity, whether a single person, or two or more people are participating in the simulation. Also, it is possible for a group to observe the various roles played when no team member, or only one team member is engaged in the simulation, and then for that group to either one at a time successively, or en mass, take over from the computer-generated roles and act as a team on a simulated event through a fractional but computer coordinated virtual environment.

For display of requested information and input of both information and information requests, each station has a similar computer terminal—usually a flat screen on the table with a keyboard, a graphic user interface selection mechanism such as mouse, touch pad, or touch screen, or other interface such as voice, all of which are known. Each station also, when appropriate, has a unique device for singular psychomotor performance input that is critical to the team activity. These latter input devices may have more or less fidelity of appearance and operation in full reality of their, but they must allow the user to simulate a performance in terms of (1) timing (2) pressure, (3) analog movement, if appropriate, (4) selection, definition of output of, and positioning of an instrument, if appropriate, (5) other critical attributes of psychomotor performance as must be present to be reflective of a team member's ability to perform at his or her "station," (6) auxiliary activities, such as "drawing dysrythmias" with a drawing input, which either build skills in an auxiliary manner or test skills of recognition in more than one manner.

The plurality of differentiated input devices and feedback constructed in a plurality of representations is an important part of an invention that is dedicated to a team simulation. If team actions were merely contributory to the essential single model, then the consequence of any team member's action could be immediately observed by all, and this would make for a singular sort of activity with contributions but not independent member responsibilities. In the differentiated input and differentiated feedback modes, the team member can attend to some activity that is not observed by the others and yet contributes to the activity. If it has not been done when a future convergence of activities results, the simulation will not go well. The role of an anesthesiologist in a surgery would be a good example. If he or she has not monitored and adjusted the levels of anesthesia necessary, the procedure would have to be aborted, perhaps at a critical juncture. Another example would be the IV station in the Advanced Cardiac Life Support. If certain pharmaceutical adjuncts are not brought into the "code" area to be at hand, the team leader cannot have them administered instantly in reaction to a change in heart rhythms. The IV team member should be doing this quick inventory in the early moments after cardiac arrest occurs when "code" team is being rapidly assembled. Critical to the team simulation, then, is the invention's requirement for a plurality of differentiated input modes, and feedback displays.

The computer modality for the team simulations requires one of several forms of networking, in order that the timing between the actions of the team members be coordinated in real time, or in near real-time—within a few seconds—for the purposes of simulated interaction. For these purposes, it is possible to store all program data in one source, as in a mainframe with terminals, or in a mixture of centralized and distributed computing, such as data storage on station but real-time program management at a main frame, or with all stations on a local network, or with all stations linked by modem to the other stations, or with all stations connected by direct data link to each other.

Core data is pre-loaded en mass at the stations and then modified slightly with input data from other stations or, in another configuration of the invention, is transmitted in larger part or whole by landlines or satellites or any combination of available data transfer methods. Due to the fractional virtual model, data for all or part of the simulation can be stored at each location, for rapid and dependable real time retrieval, or portions of it can be stored in each remote location as they apply to each remote role. Timely downloads can augment the data stored at each station as the events are recorded in the state model, and data from the remote stations can be transferred in real time to any other remote station directly, or in combination with a data transfer to a central station—such as a mainframe data base—or through that main data base exclusively.

At extremely remote stations, protocols may be established to accommodate real time delays, for instance in an international team simulation where real time is constricted by the speed of light. In this case, each station with have a "fetch" rate, and all other station's ability to operate is delayed one or more seconds until the complete data concerning actions from a remote station have entered the state model and have modified that state model in a manner that can transfer the new state of the model to all other remote stations. Thus in certain situations natural boundaries prohibit team operation in real time.

In a further embodiment of the invention, live cameras augment the team simulation by allowing participants to see not only the central state model changes in the virtual environment, but the actions of the other people involved in the simulation. In still another embodiment, the team members wear head-mounted displays as part or all of their display, or that mode is combined with force feedback through the psychomotor implements they use as team members.

A central computer or a plurality of computers holds an event-driven state model which has adjunctly an expert system for the model, and various software engines which generate a separate and differentiated visual, tactile, aural, and/or olfactory display back to each team member. In addition, team members may have communication between each other that are parallel to inputs and outputs of the event-driven state model, by means of voice transmission or by live video cameras.

OBJECTS AND FEATURES

It is one general object of this invention to provide a team simulation to improve the quality and timing of teams working a central real time objective, most specifically in,, emergency medicine and surgery.

It is another object of this invention to provide a team simulation in remote localities with no physical model involved in their simulation.

It is another object of the invention to provide a real-time, interactive relationship between individual team members in remote locations through a plurality of differentiated input devices, and a plurality of differentiated outputs relating to the individual station's effect on the simulated activity.

It is another object of the invention to provide various means of networking the team simulation in an envrionment of remote stations that will include wire transmission, satellite transmission, broad and narrowcast transmissions, and Internet, intranet, or extranet environments.

It is another object of the invention that the simulation be controlled in a virtual and fractional event-driven state model, which has no physical model but processes inputs and creates differentiated outputs based on a rule-based expert system.

It is another object of the invention that a plurality of differentiated implements be located at the various team stations.

It is another object of the invention that outputs to those stations be in differentiated representations including visual, aural, tactile, and/or olfactory displays.

It is another object of this invention to provide a team-process testing system, whereby the effectiveness and timing of various team inputs can be monitored and profiled for the evaluation of team members, and for the improvement of team processes.

It finally another object of this invention to create a fractional setting in place of a singular physical representation of anatomy, in order that teams can work together without being constrained to one location, and that medical professionals can share information and skills necessary to the proliferation new procedures in the world-wide medical profession through networked team simulation.

DETAILED DESCRIPTION OF THE INVENTION

Figure 1:
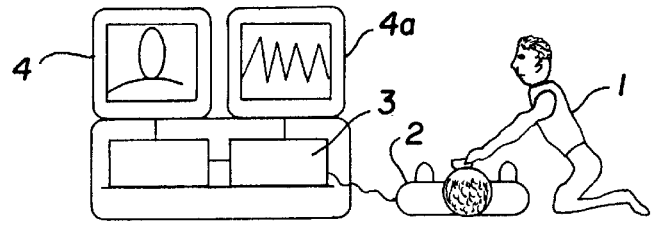
FIG. 1 shows a proposal of prior art wherein an individual's performance upon a dummy is compare to standard indicia and has a printout evaluation.
Figure 2:
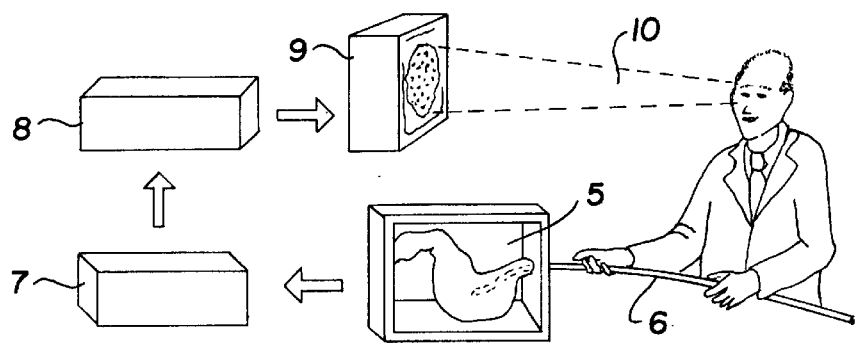
FIG. 2 shows another proposal of prior art with its model giving physical and spatial representation of a portion of the anatomy, the simulation performed with moving means by an individual, with visual output controlled by a computer with first memory means.

In prior art, FIG. 1, illustrates an embodiment of prior art according to which a pupil, 1, is manipulating a manikin of a victim, 2, with conventional sensors (not shown) which develop signals which are fed to a computer, 3, controlling a videodisc that displays feedback and further instruction to said pupil at 4 and 4a. In FIG. 2, a second embodiment of prior art, a single physical body or other single physical and spatial representation at 6 is used as the single site of procedures which may use one or more implements, 7, of moving means as input only. The position of the implement is recorded by the computer, 8, which accesses a first storage means on a videodisc, 9, and displays only a visual representation of an internal anatomical landscape. The claimed internal landscape, 10, is specifically internal so that its occlusion from the user's sight allows the simulation. The representation is most specifically visual, and thus tactile, aural, and olfactory are not claimed displays by which the internal anatomy is portrayed to the user.

In the Advanced Cardiac Life Support activity, often called a "code" in emergency room parlance, one team member leads by requesting several kinds of information and personally operates the electronic defibrillation. A second team member applies and measures the amount of ventilation given to the lungs through one or another manner of incubation of the trachea. The third code team member administers rhythmic chest compressions on the sternum, and the fourth team member administers IV's and takes blood samples for rapid blood gas testing.

For example, the #1 station would check the electrocardiogram of the victim. If there were a straight line, or otherwise appeared a non-functional heart rhythm, the team leader may decide to defibrillate. He or she would set an appropriate number of joules for electrical discharge into the heart of the patient, and would then warn every member to "stand clear." At that point, and before any discharge of the defibrillator, all contact and functions of the team members should be stopped, and there should be no physical contact by the team with the victim or with any instruments being used on the victim. The networked system is able to monitor this sequence of simulated events, and the program can provide ongoing results or remediation at any point performance of the team is seriously flawed. The program also, when appropriate, puts forth the status of actions on other stations as well as the status of the victim. Thus, the team leader, at Station #1, is able to observe if Station #3 is still compressing the chest, and should withhold the dangerous shock of the defibrillator until Station #3 is standing clear. In many cases this requires a video image of the person at Station #3 to be available to Station #1. This observation has several modalities, such as data representations of the actions, a data display or series of graphs, or animated or video realistic representations, any of which may be appropriate to allow one team member to observe the actions of other team members, or the specific feedback on actions of his or her single station.

The controlling program, as stated before, may reside in a main station of a number of interlocked stations, in a network server, or in a remote computer if one or more of the stations are at a remote location, should this be necessary to include a team member. Its media may be any magnetic, optical, or other media methodology needed to store the information needed in the simulation. The invention has at least six unique aspects:

(1) The first unique aspect of the invention is that there is no physical body or spatial representation of a body in the simulation, and so all inputs and outputs are in relation to data only.

(2) The second unique aspect of the invention is that depending on the simulation program, each team member may be fully—or only partly—aware of the actions of the other team members, who are remote in different locations stations and who are asked individually to perform in real time, in relation to other team members.

(3) The third unique aspect of the invention is that one or more team members can be missing, and that Station's function is represented as performing in a predictable and precise manner as a team member, with the central computer program providing that Station's response to the victim and to the information, actions, and commands issuing from the other stations. There will be no instructor presiding or providing addition inputs to the process.

(4) The fourth unique aspect is the provision of specially-created devices which require certain or all of the team members to demonstrate appropriate psychomotor input in response to the victim's condition or in response to information, actions, or commands by persons at other station. These devices need not represent the station's input requirement with total realism, but must have enough sophistication for the program to be able to infer proper performance with proper timing. Where such sensory input is appropriate to the simulation and analyzable by the program, these input devices reflect one or many of the following: contact by human touch, positioning of fingers, hands, or instruments, depth of insertion or compression, pounds per square inch of pressure duration, logarithmic motion progression, digital or analog input in time with or without other events, and manipulation of virtual anatomy through a remote implement. Certain examples of these devices are described in the drawings to follow but shall not be limited to those example devices. In certain simulations the device creates a digital or analog signal output of an actual instrument or device, rendered to the purposes of the simulation. In all cases, however, the input from remote stations is generated from a plurality of differentiated devices.

(5) A fifth unique quality of this invention is that part or all of a differentiated individualized feedback comes from the remote station through this plurality of differentiated devices, and the feedback to each station is differentiated to that station and represented in displays are in many cases appropriate to that station only, in visual, tactile, aural, and/or olfactory formats.

(6) A sixth unique aspect of the invention is that surgery teams can work on internal or external anatomy in the virtual model.

Figure 3:
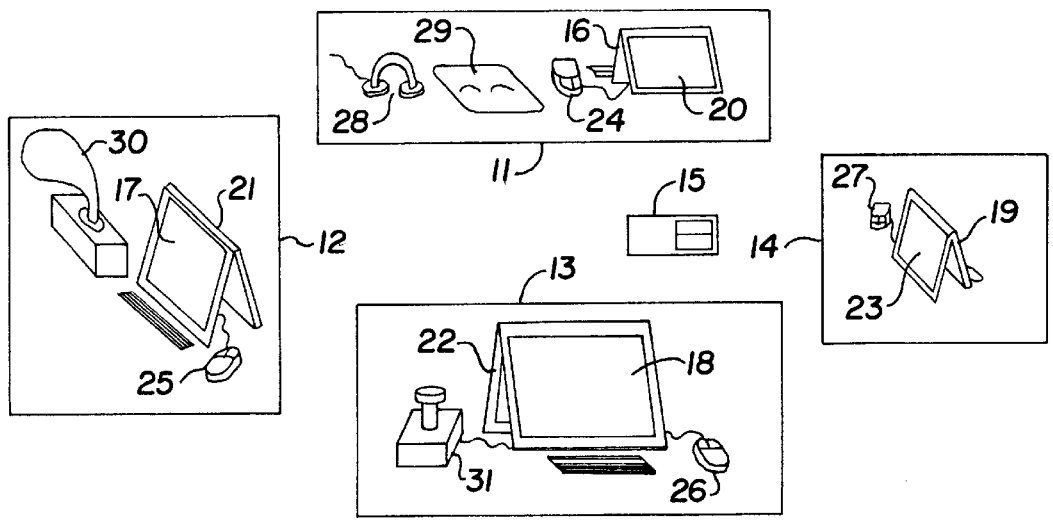
FIG. 3 shows the layout of the current networked invention, with differentiated apparatus and other inputs which may give tactile feedback, plus screens and other devices which may give a plurality of visual, aural, and/or olfactory feedback.

Thus in the first embodiment of the invention shown in FIG. 3, for Advanced Cardiac Life Support, there are four stations, the team leader and defibrillator station, 11, the intubation and ventilation station, 12, the chest compression or CPR station, 13, and the Intravenous or IV station, 14. Each is a team unit, and may have more than one person participating. In this embodiment the computer or computers, 15, can be in a central location, monitoring and linking the stations, but this simulation might also be administered through various other networked combinations, including a main computer at one remote location. Also in FIG. 3, each station has at least one screen for itself at 16,17,18, and 19, and that screen may have a duplicate screen for adjunct team members at a station or for additional representation at the station at 20,21,22, and 23. Each station has the means to input or request information via a keyboard and a mouse or other x-y matrix interface, or any manner of data or positional input, including a voice recognition interface for inputting or requesting the same information 24, 25,26, 27.

Also in FIG. 3, some of the stations also have an appropriate psychomotor input, when the more conventional inputs do not allow an adequate assessment of team member performance without a specialized input device. Three of these are seen, the defibrillator, 28, and breast pad, 29, which represents shocks which are administered at one remote station, 11, the ventilator, 30, which gives the patient air at another remote station, 12, and the chest compressor, 31, for external heart massage at still another remote station, 13.

Figure 4:
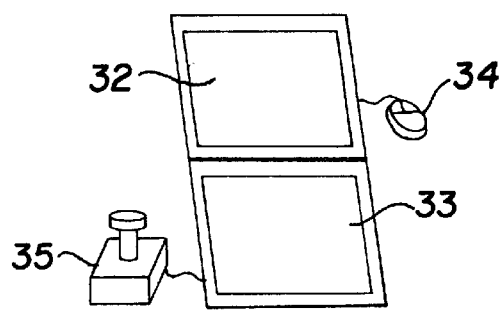
FIG. 4 portrays an embodiment of one station in the invention where more than one screen is used, for station-differentiated input and output.

FIG. 4 a different configuration of two thin video displays as seen in FIG. 3. In this station embodiment the two screens, 32 and 33 are flat on the table, giving the remote team members two visual outputs when necessary with the mouse 34 and simulated chest compressor, 35, with its tactile feedback to the team member's input.

Figure 5:
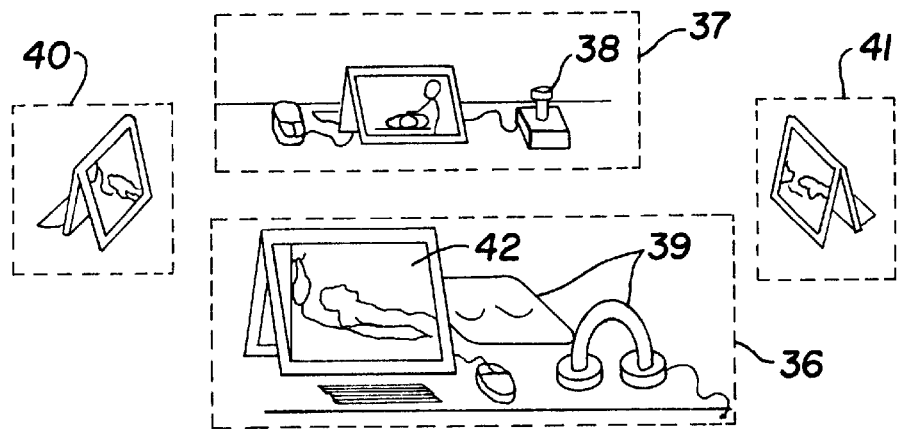
FIG. 5 shows the layout of the current invention with apparatus on a select plurality of stations with two of the team members in the same location.

In FIG. 5, another embodiment of the invention has two team-member stations, 36 and 37 with separate and distinct functions, those of chest compressions, 38, and defibrillation, 39, in the same location, sharing two displays from other locations, representing a third team member who is doing ventilations on the virtual patient in another location, 40, and a fourth team member in another location who is responsible for IVs in the virtual patient, 41. The team member may choose from several possible displays in this situation, because displays in one location may be shared as shown. As an example of the remote interaction, in a situation wherein defibrillatory shock is necessary, the defibrillator station team member at 36 must see that neither the ventilation team member represented on a display, 40, nor the IV team member also represented on a display, 41 and 42, the defibrillation station's display, nor the chest compression team member in the same location, 37, are touching the virtual patient when the defibrillator team member activates electric shock from the defibrillator.

Figure 6:
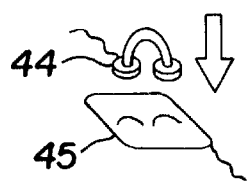
FIG. 6 shows a differentiated input/output apparatus used at a remote station for a team member to simulate use of a cardiac defibrillator in the Advanced Cardiac Life Support embodiment.
Figure 7:
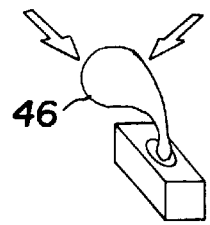
FIG. 7 shows a differentiated input/output ventilation apparatus used by the team member providing ventilation in the Advanced Cardiac Life Support embodiment.
Figure 8:
FIG. 8 shows a differentiated input/output compression apparatus used by the team member providing cardiac compressions in the Advance Cardiac Life Support embodiment.

In FIGS. 6, 7, and 8 we see several typical special apparatus for psychomotor input and output which better characterizes the performance of a team member in the specific instances for which the input devices are made. In FIG. 6, the defibrillator, 43, has a scaled-down electrical output, with a number of joules entered into the computer but not reflected in this mock device. However, this defibrillation apparatus will give a "bounce back" force feedback related to the number of joules of electric shock entered by the defibrillation team member. The pad upon which the shock is given, 44, may look more or less like the chest of a victim, but it has a pattern of mesh just below the skin surface to register placement and contact of the defibrillator by the team member at that station.

In FIG. 7, the balloon ventilator, 45, has a pressure reader inside, to measure the amount of air given by the team member at the ventilation station. In FIG. 8, the chest compressor, 46, has a linear potentiometer or an instrument with like purpose to measure the depth, rapidity, and "shape" of the cycles of compression and decompression.

Figure 9:
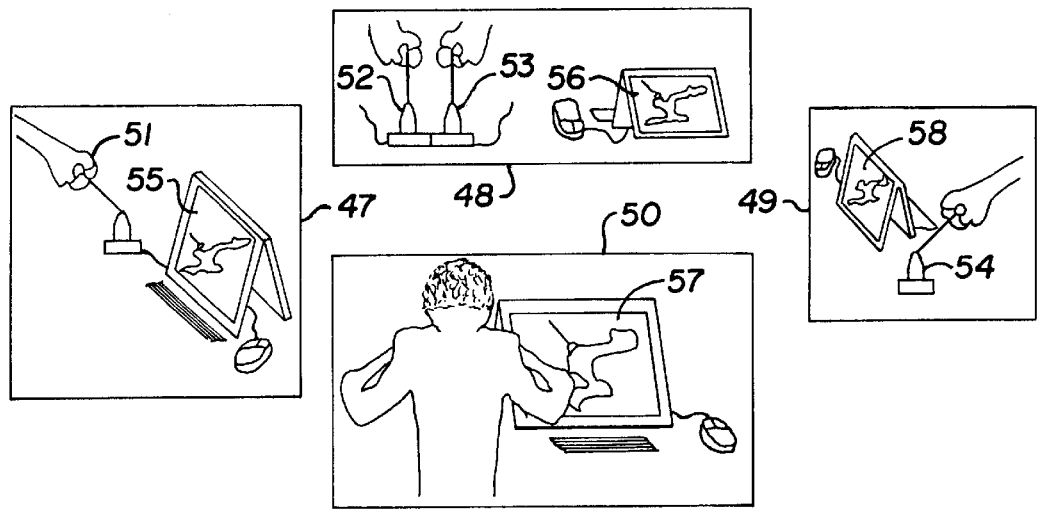
FIG. 9 shows a surgical embodiment with team members using a plurality of differentiated input/output apparatus to participate in a virtual surgery.

FIG. 9 shows another embodiment of the team simulator, as used in surgical simulations. All parties are involved in working on a single virtual patient, but the virtual model is fractional in its differentiated inputs and in its differentiated displays. Each party may have certain equipment at the remote site, such as an apparatus for camera manipulation on one site and an apparatus with grasping instruments at another site and still another apparatus to input, and receive force feedback from multiple cutting, burning, probing and grasping instruments at another site. There may also be voice commands given by a lead surgeon, which are heard at all sites as the data is passed. There may also be video cameras showing the performance of each team member to the others. In every case, one or all of the remote roles can be played by the computer as part of an expert system which dictates performance keyed to the status of the simulation as a whole.

In prior art, this simulator would involve people gathered around a single mounted frame, where their stations and instruments would be spatially and physically located in exact reference to the body of a patient in surgery. In this invention, however, the participants in a semi-invasive surgical procedure such as a laparoscopic gall bladder removal would not be gathered around a physically and spatially representative model, but on stations separated by a table, or in separate rooms of a building on an internal network, or in geographically separated hospitals across the country or across the world by means of a specified and governing intranet. These stations would each have one or more instrument inputs unique to the part of the task the person at each station would play in an actual operation. For instance, in the FIG. 9 embodiment of the invention, there are remote stations for an anesthesiologist, 50, a person handling irrigation and suction, 49, an assistant surgeon, 47, and a lead surgeon, 48.

In FIG. 9, various remote stations at 47, 48,49, and 50 participate in a surgery through their various roles with various instruments. At 47, the instrument, 51, is a grasper only, with the role being an assistant surgeon, while at 48, the instruments 52 and 53 are a grasper and a changeable cutting device in the hands of the station designated lead surgeon. At 49 is an instrument 54 used with the role of assistant surgeon with a vacuum device, constantly clearing the operating area, and at 50 the role is that of anesthesiologist. All parties can see the procedure from the point of view it would occur in the operating room, 55,56,57, and 58, but each is also able to alternate those screens, or use other remote screens, to view other actions by other participants away from the internal anatomical areas, or to see, hear, or smell feedback appropriate only to the team members single differentiated station.

Figure 10:
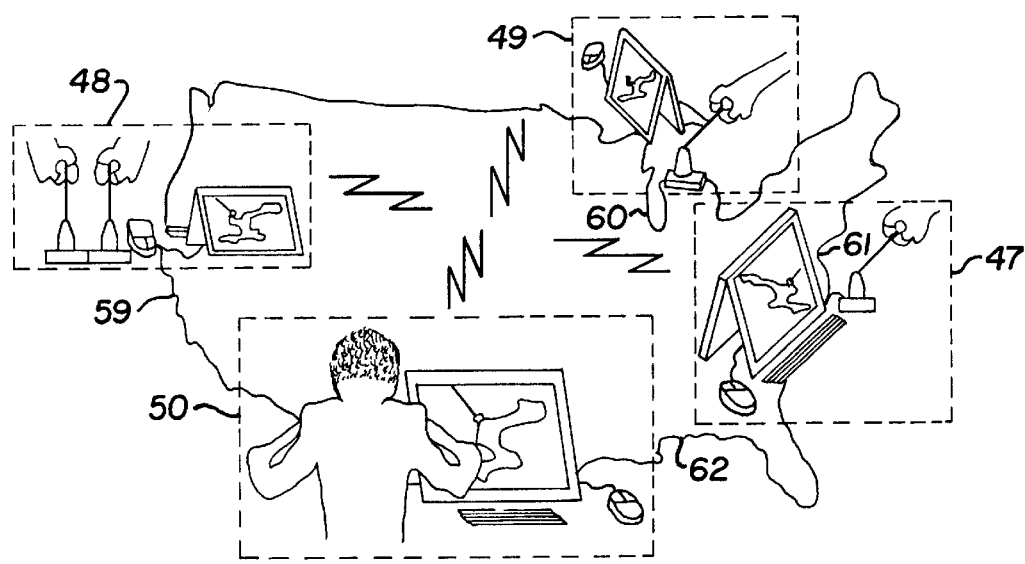
FIG. 10 shows the FIG. 9 surgery simulation conducted in remote locations via intranet or similar station configuration.

The virtual model is modified by events that occur in any remote station, and also by the remote "roles" played by the computer. A central computer may control the state model, or the control computer for the state model may be located at any of the remote stations, or be replicated in all of the remote stations so that the data transfers would be only that data which modifies the state model. In FIG. 10, the remote stations are the same remote stations, at 47,48,49, and 50, but now they are located in diverse corners of a nation, 59,60,61, and 62 with surgeons able to participate in new procedure simulations through the combined operational simulation.

Figure 11:
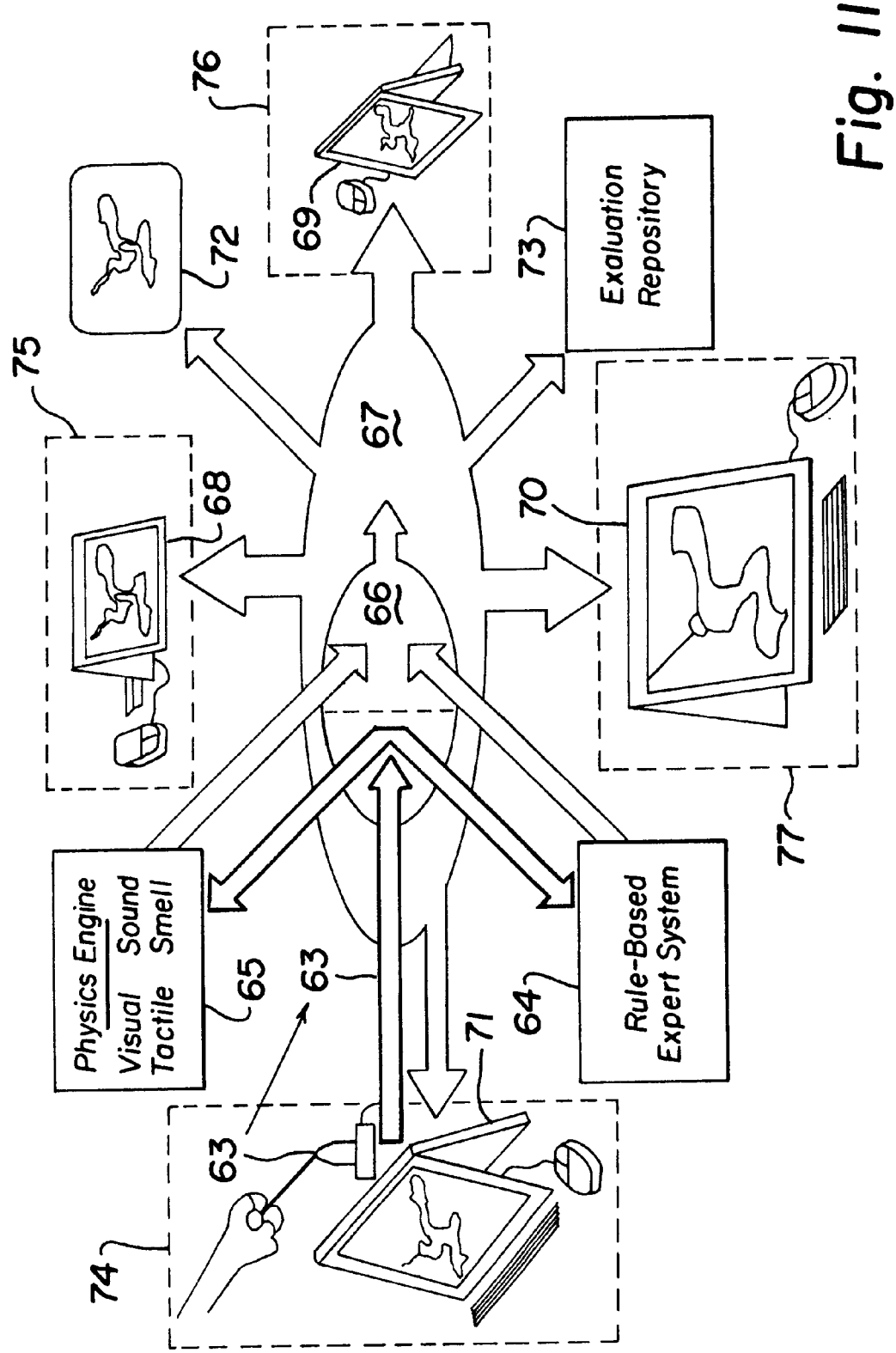
FIG. 11 shows the fractional event-driven state mode that evaluates each input by rule-based expert system and constructs differentiated output representations to various team members at their stations, as well as gathering data for an evaluation profile.

In FIG. 11, the virtual environment created is modified by an event, 63, operating upon an event-driven real time state model, 66, after processing by a real-time subset which is a rule-based expert system in the first memory means, 64. This expert system then checks each second memory means at each remote station, 74,75,76, and 77, to sequence the fractional state model, and then a subsequent real time subset for determining all current physics based on modifications to a state model, 65. Then a later subset activity, 67, uses the modified state model for actuating and outputting changes to the remote stations, 68,69,70, and 71 to any monitors watching the procedure but not interacting, 72, and to a storage and evaluation subset, 73. Real time is based primarily on the user's perception of lag compared to what his or her senses would perceive in the actual medical procedure. Ideally, real time components within the subsets would be faster than the composite real time of the remote station user's tactile perception, which may require the highest speeds in medical simulation, and a generation of unique physical feedback generators in areas of visual, tactile, olfactory, aural, and even taste representations and displays.

Figure 12:
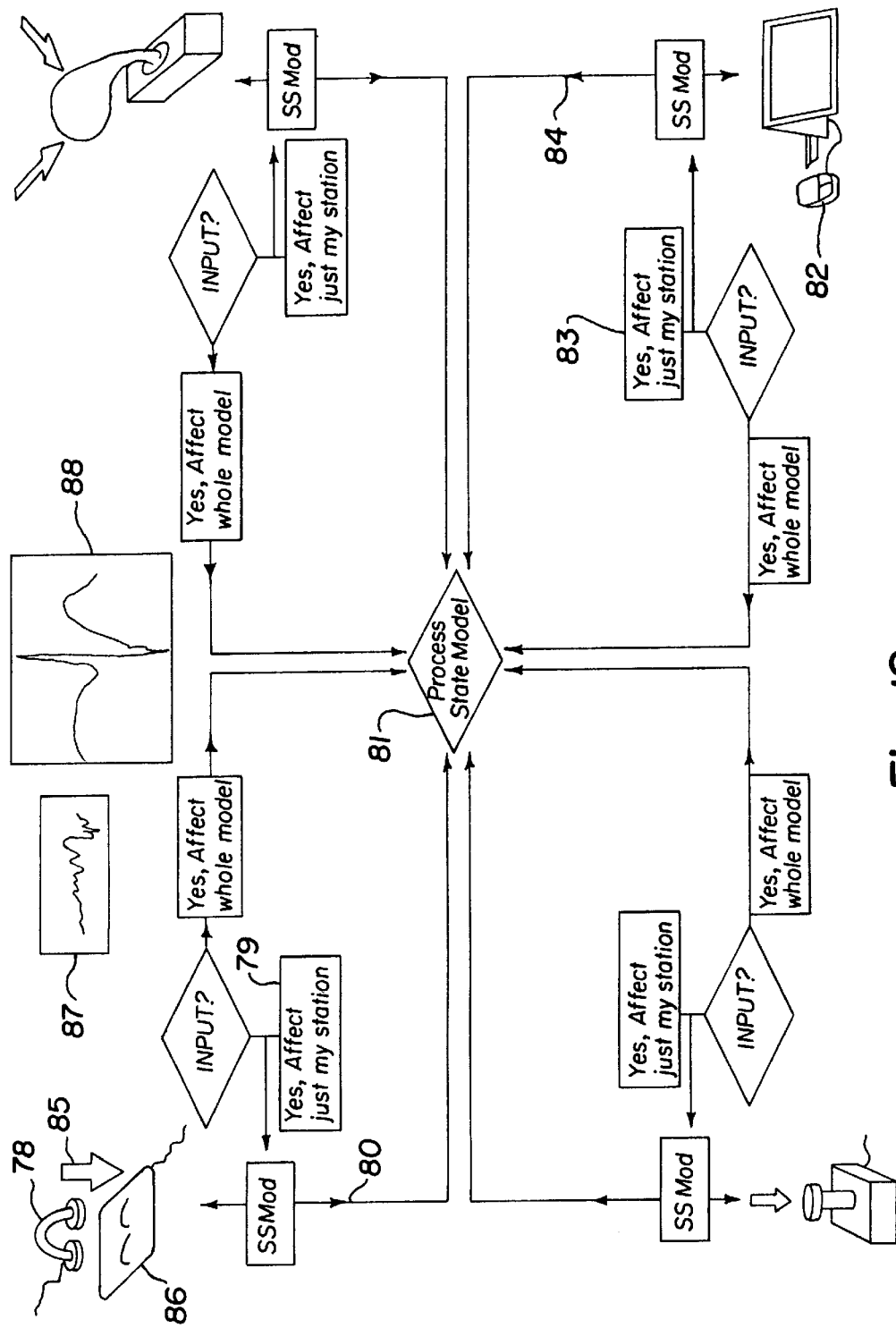
FIG. 12 shows one embodiment of the data transmission for a surgical team application, in which certain information is processed discreetly at the individual stations while other input goes to the event-driven state model.

FIG. 12 shows an embodiment of the invention wherein the use of first and second memory means are involved in a duplex or dual-track means of transmission of each event to and from the state model for the purpose of modifying the state model in real time or modifying the station memory in real time but leaving the state model memory unmodified until a future juncture. At 78, the defibrillator is set at 300 joules by the team member at that remote station. This event, 79, however, affects only the single defibrillator station until other actions combine, so therefore it is not a real-time event in the simulation which actuates a change in the fractional, virtual model which is displayed to all team members. It is stored for reference in the second memory means at that specific station, 80, but may be queried at a later point by the first memory means, 81, to be coordinated with the event-driven state model dependent upon later actions of the defibrillator team member, or actions of other team members. In a similar manner, the IV station team member, 82, may order calcium chloride, 83, in anticipation of its need during defibrillation. If it is then later requested by another team member, the first memory means expert system will check to see if it is in the second memory means, 84, at the IV station, and if so, the request of that other team member can be instantly filled rather than waiting for a period that could decisively impinge on the success of life stabilization. One such later action might be the actual defibrillation by the team member of that station, 85, generating an electrical impulse into the apparatus representing the chest of the patient, 86. The electrical defibrillation action would then cause the first memory means expert system to query the second memory means at the IV team member station. If the IV team member had put in the right amount of calcium chloride prior to the defibrillator team member's defibrillation shock input, the resultant modification of the event-driven state model may change the patient's ventricular fibrillation, 87, into significant positive heart action, 88. The defibrillation station and the IV station have thus given specific and differentiated inputs to the fractional model, 81.

Figure 13:
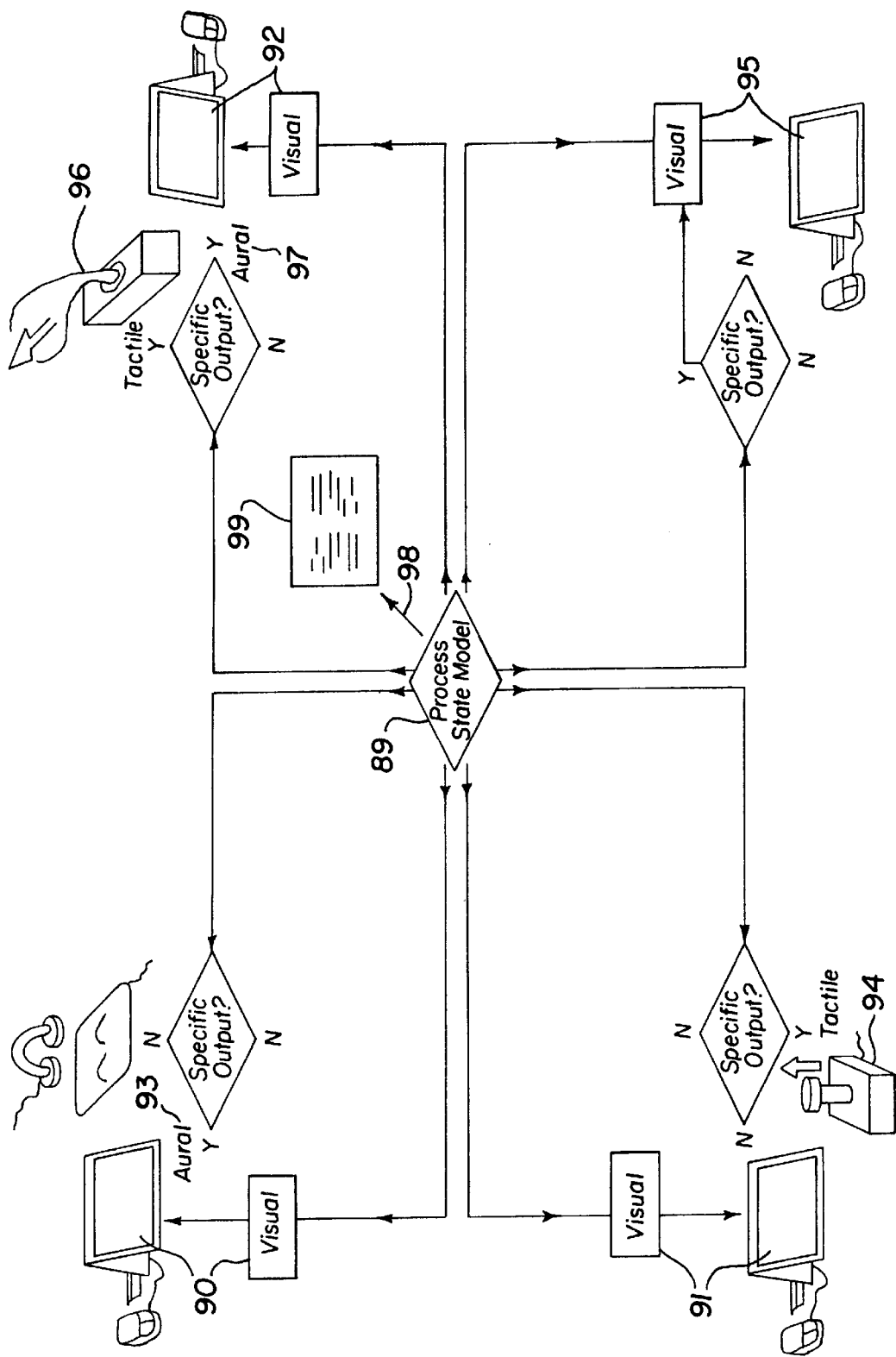
FIG. 13 shows the process by which differentiated feedback goes to remote team stations from the fractional model.

In FIG. 13, the opposite direction of the input from stations to second and first memory means is the output from the first memory means, 89, to the general virtual model replicated at 90, 91, and 92, in its general displays; and in parallel to the plurality of specific and differentiated displays at the remote stations, 93,94, 95, 96, and 97, with a third memory means, 98, giving real time remediation to each team member and constructing a profiled team evaluation, 99. The feed back to the defibrillation station will be a general visual picture 90 from the first memory means but a specific differentiated aural feedback relating to the sound of the defibrillator, 93. The chest compression station will have general visual feedback at 91, but specific force feedback on its compression at 94. Diagonally across FIG. 13, in real time, the team member at the ventilation station will experience an exhalation of air, filling the balloon apparatus at as the compression member feels the compression of the chest force the air out at 96, and hearing the sound of exhaling air at 97, while seeing the general visual feedback at 92. The IV station, on the other hand, gets its specific and differentiated feedback visually at 95.

Figure 14:
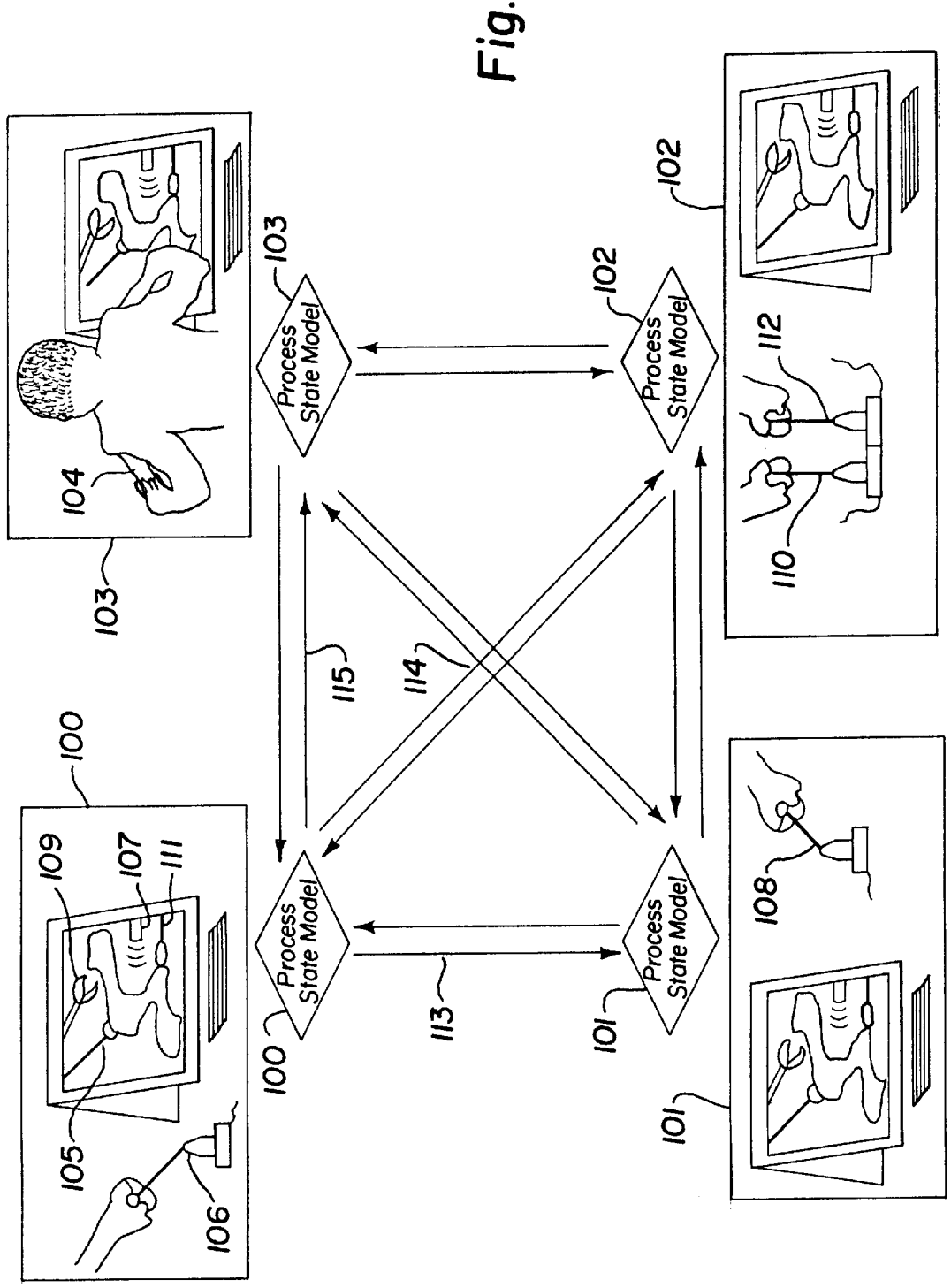
FIG. 14 shows remote stations each containing the fractional model and imparting data to other stations to modify those stations but receiving differentiated visual, tactile, aural and/olfactory representations from their own local stations.

FIG. 14 shows a surgical team embodiment of the invention which facilitates short transmission time over long distances, by initially replicating first and third memory means at each location so that each station processes those and modifies those as well as its won differentiated and specific second memory means. Updates carrying smaller changed segments can thus be transmitted rapidly to the other stations as appropriate to each site.

In this phase of this surgical embodiment, the team members at remotely located stations, 100, 101, 102, and 103 see the same anatomy in visual representation, with their individual instruments contributing in separate and differentiate implements and receiving separate and differentiated feedback through those implements from a combination of first memory and second memory means. The camera, 104 is not seen on the general first memory means visual representation, because the camera is of course composing the virtual image. At 100, the various instruments onscreen relate to the various implements of surgery, the assistant surgeon station with a grasper, at 105 and 106, the suction station, at 107 and 108, the lead surgeon with two separate and distinct implements, scissors at 109 and 110 and a grasper, at 111 and 112. Thus if the team member with the grasping implement at 100 grasps and pulls on a section of tissue at 105 and 106, his secondary memory means gives him the separate and differentiated force feedback at 106, a tactile display, while his first memory means converts his image and then sends only that small exact data at 113, 114, and 115 to first memory means at 101, 102, and 103 for conversion to so that the real time modification of the virtual image occurs at all the stations simultaneously. However, in this instance, only at the lead surgeon station is any other tactile force feedback generated by signals from the first memory means, 114, to a second memory means linked to separate and differentiate apparatus on the single grasping instrument, held by the team member playing the lead surgeon at 110.

Figure 15:
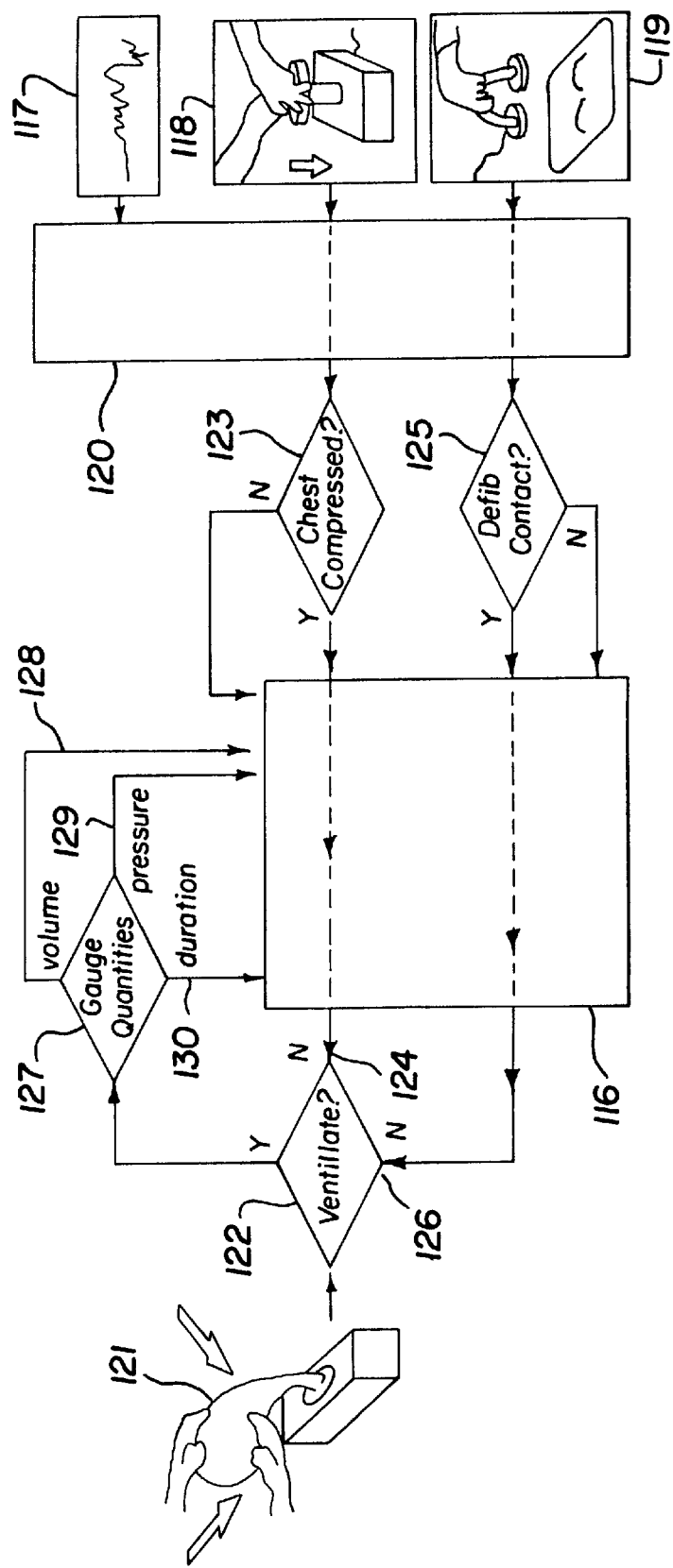
FIG. 15 shows coordination of a team input from second and first memory means.
Figure 16:
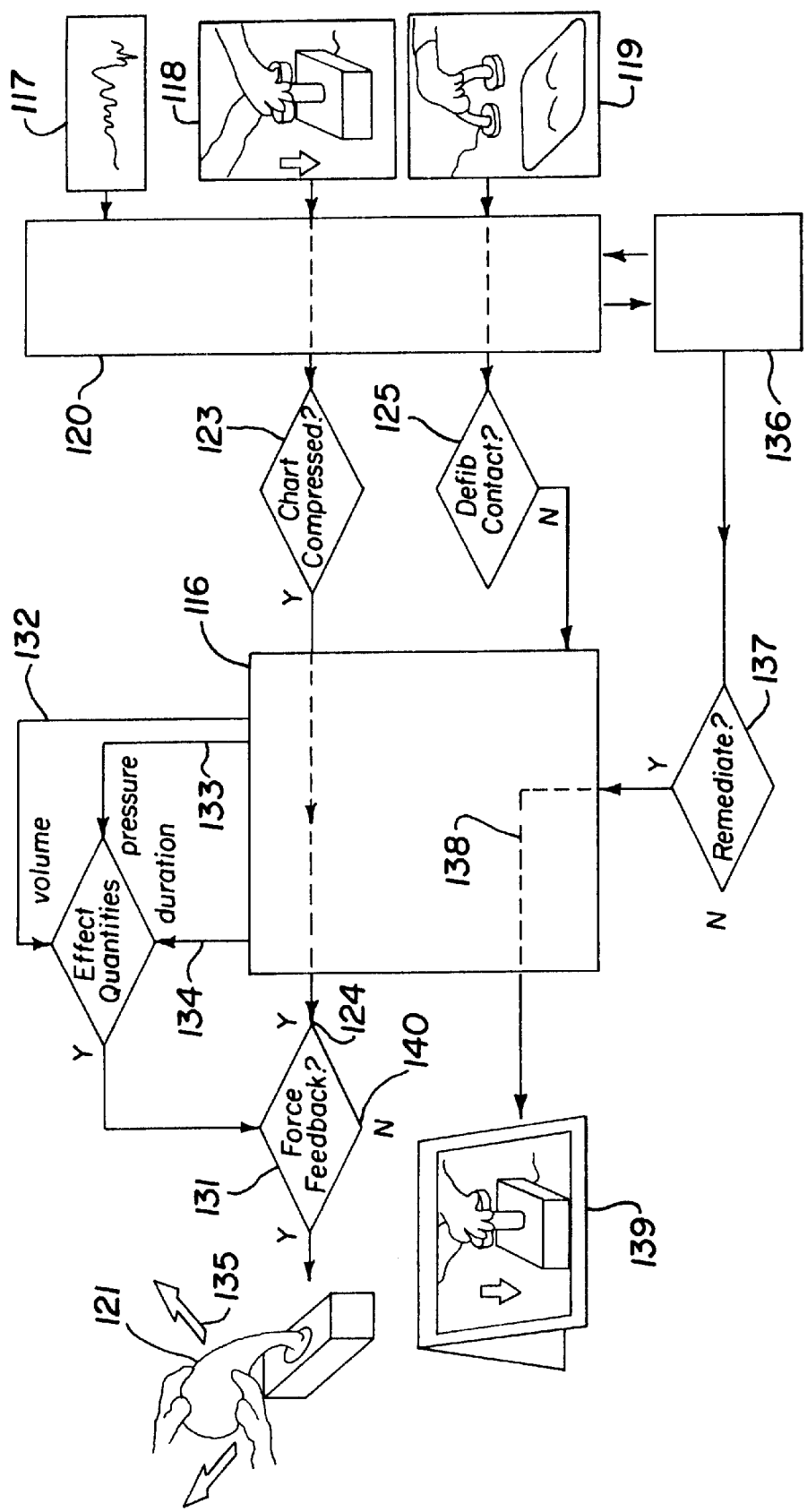
FIG. 16 shows output coordination to a team station from first and second memory means.

In FIG. 15, the second memory means, 116, which has a counterpart at each remote team member station, 117, 118, and 119, serves to not only accept, but to evaluate and screen specific and differentiated input at the site of the remote station, before the complete data on each team member's action is conjoined in the fractional state model with input from other remote team member stations at the first memory means, 120. When the team member at the ventilation station (giving the patient air into the lungs) chooses to ventilate, his or her input is via a specialized and differentiated implement for generating air to the patient, 121, and there is first a binary input, 122, that ventilation can occur on which the action of the ventilation device is dependent. This binary input queries the secondary memory means at the ventilation station, 116, to ascertain if other events in the system might prohibit the ventilation. Two inputs to the second memory means from expert system of the first memory means, 123 and 125 can result in a nullification of the ventilation at 124 and 126, carried out within the second memory means, 116, at the ventilation team member's station. In this example, the defibrillator at 119 is not in operation, so it does not prevent a ventilation at 126. If the ventilation were allowed at 127 there would be data input to the second memory means of volume or air, 128, pressure of air, 129, and duration of the ventilation, 130 to input a quantitative profile of the ventilation to the first memory means. However, the chest compression, 118, is in a downward stroke. In that the patient would not be able to receive air because of a compressed chest, the chest compression input, 123, to the second memory means causes the second memory means to nullify the ventilation at 124. In FIG. 16, dealing with outputs, it will be shown that the ventilator is given a force feedback display that makes it physically impossible for the team member to use the specialized and differentiated ventilation apparatus to perform a physical ventilation.

Whereas FIG. 15 dealt with the input to the second memory means at a team member's remote station, FIG. 16 continues with the output of the second memory means, 116, in examination of same event using the specialized and differentiated ventilation implement, 121, in the ventilation station. The output from the second memory means at the ventilation team member's remote station is in this instance of two types, a tactile and a visual display. The tactile display, 135, is caused first by the rule-based expert system in the first memory means, which finds that one cannot ventilate lungs when the chest is being compressed by another team member, 118, at the same time. Thus for realism, the ventilation team member receives the tactile feeling of the blockage and exhalation of air, 135, in addition to any other remediation which would be appropriate. This is accomplished through the specialized and differentiated ventilation apparatus, 121, which has force feedback generators for exhalation, 131, in amounts for volume, 132, for pressure, 133, and for duration, 134, dictated by the second memory means, 116, from data on the timing and force of the chest compression, 118 in input it has received from the first memory means, 120. The third memory means, 136, which deals with remediation and evaluation profiles, may send back a remediation, 137, to the second memory, 138, means at the ventilation station only for visual, aural, or olfactory display, as on the ventilation team member's screen at 139 only, and not to any other second memory means at any other team station. If the defibrillator team member had activated his defibrillator at 119, then the output of the first memory means at 125 would have indicated a positive state to the second memory means of the remote ventilation station, and would have caused a defibrillation force feedback on the implement at 140, in one embodiment, a mild shock for the ventilator.

Figure 17:
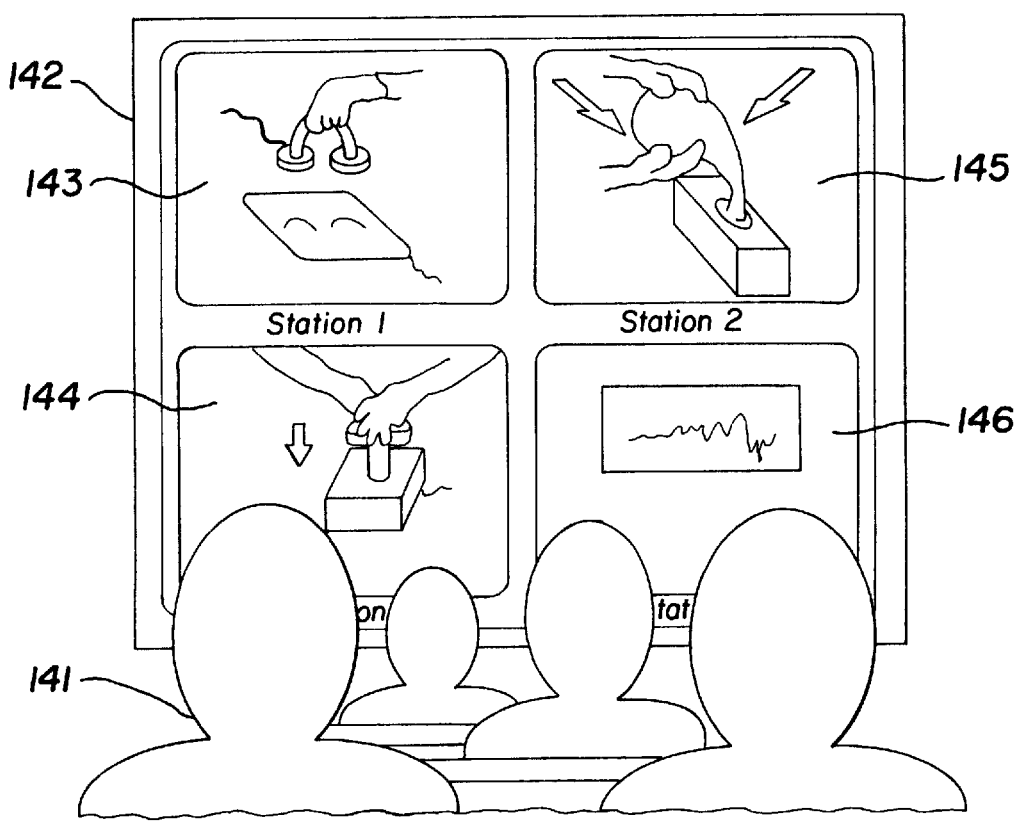
FIG. 17 shows a group monitoring the team activities and able to see and hear various inputs, outputs, and other communications between team members, but unable to experience the use of differentiated implements, any olfactory feedback, and certain differentiated tactile feedback on the plurality of apparatus at various team stations.

FIG. 17 shows the ability of the fractional, multi-locational team simulator to be observed by non-team members in still other remote locations. This may be accomplished by video cameras on each station, to show the live performance, but it also may be done by animation that derives directly from the fractional, virtual model. In one embodiment, a group, 141, with a large screen computer projector, 142, can elect to see the performance at any one of the stations, 143, 144, and 145, or any vital sign of the simulated patient in the model, in this case being the still fibrillating heart rhythm, 146.

Unlike prior art, where the simulation is based around a physical and spatial model representing anatomy, this apparatus and methodology is constructed around a numerical virtual model, which is fractional in its relation to separate team members at remote stations, each with differentiated input and output apparatus, each having a different part of the simulation by contributing remote events. This invention supercedes prior art and introduces a completely new invention, with new processes and new opportunities.

What I claim is:

1. A virtual simulator for the training of medical teams in the coordinated treatment of a single patient comprising:
   (a) An event-driven state model of the virtual patient governed by a rule-based expert system in software which is replicated at each station, and
   (b) a plurality of input/output stations:
      (1) each representative of a function to be performed by a team unit,
      (2) each station comprised of a plurality of data receivers to receive differentiated data from others of said stations, (3) each station with at least one representative output means on location, and (4) each station able to process and send differentiated data to other stations via a data transmitter, (5) each station with at least one manual input means on location, and (6) each station with memory means and data processing means to hold and modify the event-driven state model.

2. A virtual simulator for the training of medical teams in the coordinated treatment of a single patient as in claim 1, using a central processor as one unmanned station for the first memory means holding the entire event-driven state model of the patient in software, and monitoring changes through an expert system existing only in the central computer.

3. A virtual simulator for the training of medical teams in the coordinated treatment of a single patient as in claim 2, but with the central processor located at one of the team stations.

4. A virtual simulator for the training of medical as in claim 1, but with a plurality of virtual patients, as in a catastrophic accident.

5. A virtual simulator as in claim 1, wherein the input apparatus has moving means.

6. A virtual simulator as in claim 1, wherein the input apparatus is responsive to position and actuation of said implement.

7. An apparatus as in claim 6, wherein said instruments are selected from a group consisting of: defibrillator, ventilator, intravenous system. chest compressor, scissors, irrigator, stapler, cutter-stapler, grasper, suction device, circular stapler, flexible endoscope, injection catheter, biopsy catheter, cautery snare catheter, balloon catheter, stent-placement catheter, rotating-blade catheter, drill, routing tool, cutting laser, sealing laser, mechanical sewing tool, bridling tool, probe, camera, needle and thread, scalpel, canulla.

8. A virtual simulator as in claim 5, wherein the input apparatus also gives output to the team unit in visual, tactile, aural, or olfactory representations.

9. A virtual simulator as in claim 1, where at least one team member wears a head-mounted display.

10. A virtual simulator as in claim 1, wherein instructors or other monitors can watch a plurality of team member's performance from various stations.

11. A virtual simulator as in claim 1, wherein an instructor or an administrator can define parameters of the simulation before it begins.

12. A virtual simulator as in claim 1, wherein one or more stations can be absent, and its role be played by the computer.

13. A virtual simulator as in claim 1, which is capable of operation in various networked modes, including wire transmission, satellite transmission, broadcast and narrowcast transmissions, and internet, intranet, extranet or other environments for networking remote stations over any given distance.

14. A virtual simulator as in claim 13, which uses parallel communication modes between the team members such as direct video or audio communications.

15. A virtual simulator as in claim 1, with a third memory means to accumulate performance data for remediation and performance profiles.

16. A virtual simulator as in claim 1, with a rule-based expert system to monitor and screen various team performance actions in relation the medical task presented.

17. A virtual simulator as in claim 1, with a state model in software which changes in real time based on selected event input from stations.

18. A virtual simulator as in claim 1, with a duplex or dual-track means of transmission of each event to and from the state model for the purpose of modifying the state model in real time.

19. A virtual simulator as in claim 1, with at least one means of parallel communication between stations which does not become an event that modifies the state model.

20. A virtual simulator as in claim 1, with a rule-based expert system which filters the event inputs to correctly identify the said output display representations for said stations by any visual, aural, tactile, and/or olfactory means.

* * * * *